Figure 1:
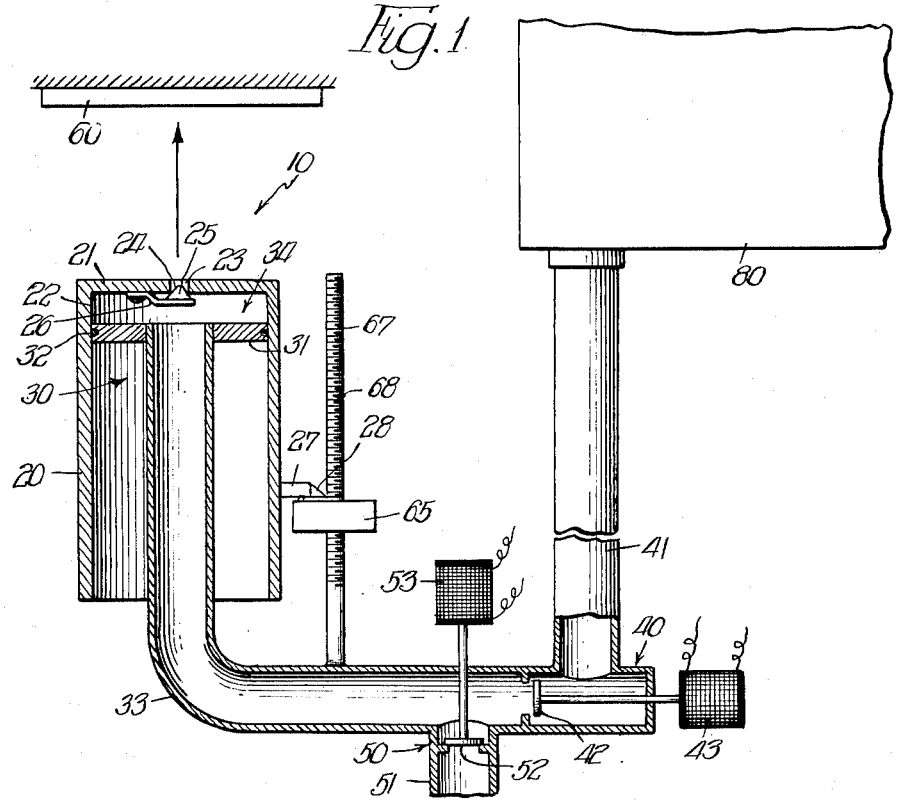

Aug. 17, 1965  E. J. WILLIAMS  3,201,002

LIQUID MEASURING AND DISPENSING APPARATUS

Filed May 20, 1964

INVENTOR.
Earl J. Williams,
BY
Hume, Groen, Clement + Hume
Attys

United States Patent Office 3,201,002
Patented Aug. 17, 1965

3,201,002
LIQUID MEASURING AND DISPENSING APPARATUS
Earl J. Williams, Fox River Grove, Ill., assignor to Liquid Package Equipment Corp., Woodstock, Ill., a corporation of Delaware
Filed May 20, 1964, Ser. No. 368,961
3 Claims. (Cl. 222—205)

The present invention relates to machinery for the measuring and discharging of fluid and particularly to a new and improved apparatus for automatically measuring and discharging quantities of fluid.

In the filling of a series of liquid containers such as milk cartons, bottles or the like, it is necessary to provide a device which is capable of both rapidly and accurately measuring a quantity of liquid and discharging it into each container to be filled. It is especially important where milk or other liquid food is involved that such a machine be capable of as substantially a germ-proof operation as possible, with a minimum of contact between the fluid and the atmosphere, and with no possibility of contaminants entering the machine and being discharged with the fluid. It is also desired that such a machine be capable of being easily and thoroughly cleaned. A further desired feature is the prevention of foaming.

Prior machines have generally utilized open filling tanks discharged at a pre-set level or have utilized liquid pumps in which a piston is driven by a hydraulic or pneumatic cylinder. These prior machines are deficient with respect to various of the above-mentioned important characteristics.

It is accordingly an object of the invention to provide a machine which accomplishes the above desired characteristics in a new and novel apparatus.

It is a general object of the present invention to provide a novel means for rapidly and accurately measuring and discharging a predetermined quantity of fluid.

A further object of the invention is to provide a simple and easy-to-clean apparatus for the automatic measuring and discharging of fluid in which there is no contact between the fluid and the atmosphere until the fluid is discharged from the apparatus.

Another object of the invention is to provide a new and improved fluid measuring and dispensing apparatus wherein the apparatus may be easily set to dispense a wide range of measured quantities of fluid, and in which the fluid is measured by direct volumetric means.

Further objects and features of the invention pertain to the particular arrangement and structure whereby the above-identified objects and other objects of the invention are attained.

In general, the present invention is directed to an apparatus for discharging a measured volume of fluid utilizing a container means slidably mounted over a fixed base to form a closed chamber therewith, the movement of the container means being responsive to the volume of fluid within this chamber, the movement and discharge of fluid being accomplished by means responsive to the change in position of the container means.

Figure 2:
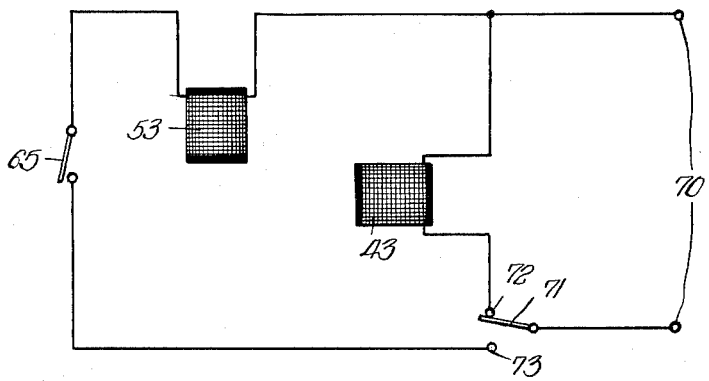

The invention, both as to its structure and mode of operation, will be better understood by reference to the following disclosure and drawings forming a part thereof, wherein:

FIGURE 1 is a representation in schematic form of an embodiment of the invention; and FIGURE 2 is an electrical circuit which may be utilized in the embodiment of FIGURE 1.

Turning now to the drawings, and FIGURE 1 in particular, there is shown therein a liquid measuring and discharging apparatus 10 in schematic form in accordance with the present invention. Basically, the apparatus 10 includes a movable charging container 20 slidably mounted over a base structure 30, a fluid inlet structure 40, a fluid outlet structure 50, an upper stop 60, and a movable limit switch 65. The movable charging container 20 is filled by introducing liquid therein through the inlet structure 40 and the base structure 30. The charging container 20 moves upward as the liquid is introduced until it reaches the upper stop 60, which prevents further upward movement, and thus determines the maximum volume of the fluid charge. Upon the closing of the inlet structure 40 and the opening of the outlet structure 50, the fluid charge present in the charging container 20 flows down through the outlet structure 50, thus lowering the charging container 20. When the charging container 20 has dropped a pre-set distance, it contacts the limit switch 65, which causes the outlet structure 50 to close.

The charging container 20 may be constructed, as illustrated here, in the form of a cup-shaped structure positioned with its closed end 21 upward. Its interior surface 22 is smoothly finished, preferably as an even cylindrical bore. In this manner, the interior surface 22 is adapted to form a fluid-tight slidable fit with respect to the base structure 30. At the end 21 of the charging container 20, there is located a small hole comprising a vent 23 and having a valve 24. The purpose of the vent 23 is to enable the bleeding of all air or gas present in the entire fluid system of the apparatus 10, particularly that within the charging container 20. The valve 24 may be of any simple, conventional type, preferably adapted to be self-closing. It here consists of a conical plug 25 held against the interior of the vent 23 by means of a spring 26. Providing fluid pressure is present in the system, air or gas may be removed by pressing downwardly on the end of the plug 25 so as to unseat it from the vent 23. When all air has been thus forced out by the fluid pressure and allowed to escape through the vent 23, the plug 25 may be released and spring 26 will then cause it to seal vent 23. The use of such a simple bleeding arrangement is made possible by the low fluid pressures which may be utilized with the apparatus 10.

Secured to the charging container 20 at any convenient point is an extension 27 for the operation of the limit switch 65. The configuration of the extension 27 is not important, as long as it can actuate the switch 65, which is preferably a conventional microswitch. In the configuration shown, the extension 27 is also provided with a pointed extremity 28 to serve as a pointer for a direct reading volumetric scale 67.

The base structure 30 includes a fixed platform 31 having a fluid seal on its outer periphery, preferably formed by a conventional O-ring 32 which makes a tight-fitting but slidable contact with the interior surface 22 of the charging container 20. Secured to the fixed platform 31 by threading or other suitable means and communicating therethrough is one end of a connecting pipe 33. While the pipe 33 is here shown as of relatively rigid construction in order to hold the platform 31 in a stationary position, the platform 31 could be fixed in position by any convenient support means and the connecting pipe 33 could then be of flexible construction.

It will be observed that because the platform 31 forms a fluid-tight seal with the interior walls 22 of the charging container 20 that the charging container 20 forms an enclosed volume therewith, i.e. a space or chamber 34 is formed whose sole outlet is the connecting pipe 33. The volume of this space 34 is completely variable, and it increases in direct proportion to the upward movement of the charging container 20.

The variable volume space 34 forms an extremely sanitary fluid measurement arrangement. It is completely sealed to the atmosphere, as discussed above, and may be completely drained of any air or gas by means of the vent 23. The absence of any air or gas also prevents foaming, as there is no gas-air interface where foaming may occur. Further, any fluid which should possibly escape through the fluid seal 32 will necessarily run downward away from the seal 32. This greatly reduces the possibility of contaminated fluid re-entering the space 34.

The inlet structure 40 here consists of an inlet pipe 41 connecting a source of fluid under pressure to the lower end of the pipe 33, and a valve 42 actuated by a valve operating mechanism 43. When the valve 42 is open, the inlet pipe 41 communicates with the pipe 33 and thereby the chamber 34 of the charging container 20. The source of fluid under pressure may be, for example, an overhead tank 80 somewhat high than the maximum height reached by the charging container 20, or a relatively low pressure conventional (not shown) pump taking fluid from a reservoir to the inlet pipe 41. The pressure of fluid entering the inlet pipe 41 should be sufficient to raise the charging container 20 by the force of the fluid pressure pressing against the end 21 of the charging container 20. Increasing the inlet pressure increases the upward acceleration of the charging container 20 unless frictional or other forces are introduced. However, a high inlet fluid pressure is neither necessary nor desirable. It will be noted that except for the small amount of force necessary to operate the valves, that the entire apparatus 10 is operated solely by the energy of the incoming fluid and that no external source of power is required. The inlet valve 42 and the valve operating mechanism 43, shown here in schematic form, may be of any desired conventional type. One such exemplary type is a simple electrical solenoid valve operating mechanism 43 which pulls the valve 42 to the open position upon the application of electric power to the solenoid, thus allowing fluid to pass from the inlet pipe 41 into the connecting pipe 33, and is spring-loaded for automatic rapid closing when the electric power is interrupted.

The outlet structure 50 may be very similar to the inlet structure 40, here comprising an outlet pipe 51, a valve 52, and a valve operating mechanism 53. The valve 52 and valve operating mechanism 53 may be structurally identical to the valve 42 and valve operating mechanism 43, but the valve 52 is so located that in its open position it connects the connecting pipe 33 to the outlet pipe 51, thus allowing fluid present in chamber 34 to flow down the pipe 33 and out the outlet pipe 51.

The valve operating mechanisms 53 and 43 are preferably connected so as to operate alternately, so that the valves 42 and 52 will never both be open at the same time. This prevents fluid entering inlet pipe 41 from escaping through outlet pipe 51 without having been measured accurately in the charging container 20. It is to be understood that electrical valve operating mechanisms and normally-closed valves are selected by way of example and are not essential to the invention. A hydraulic system would be equally suitable.

The accurate measurement provided by the apparatus 10 is accomplished and controlled by limiting the physical movement of the charging container 20 itself between predetermined positions. The volume of the space 34 is the product of the horizonal area and vertical height of the space 34. (The latter is determined by the vertical distance between the upper end 21 of the container 20 and the fixed platform 31.) As the horizontal area remains constant, the only quantity which varies in the vertical movement of the charging container 20 is the vertical heighth of the space 34. Thus, the volume of the space 34 varies in direct linear proportion to the vertical movement of the charging container 20. Therefore, to determine a volume of liquid desired to be measured and discharged, it is necessary only to limit the movement of the charging container 20 between an upper and a lower opposition, i.e. limit the charging container 20 to a fixed distance of vertical movement. The volume of fluid contained in the pipe 33 has no effect on the measurement, as it remains constant.

Due to the novel structure of the invention, the limits placed on the vertical movement of the charging container 20 may be accomplished in at least two ways, that is, by use of direct physical retention to stop the movement of the charging container 20, or by controlling the movement of fluid into or out of the space 34. With substantially incompressible fluids, i.e. liquids, the vertical movement of the charging container 20 will be directly related to the volumetric movement of fluid into or out of space 24 through the pipe 33. Therefore, closing the inlet valve 42 will immediately stop upward movement of the charging container 20 when it is being filled, and closing the outlet valve 52 during the downward or discharge movement of the charging container 20 will stop its downward movement.

The upper stop 60 of the embodied apparatus 10 utilizes a fixed position mechanical stop. It may consist of a plate rigidly secured to the framework of the machinery (not shown). It is so situated that the upper surface 21 of the charging container 20 will be arrested by it, thus serving as the upper limit to the vertical movement of the charging container 20 and hence determining the maximum volume enclosed within the space 34.

The lower stop of the apparatus 10 utilizes the movable limit switch 65, which here consists of a conventional microswitch having normally closed contacts slidably mounted upon a vertical support 67, which is secured to any convenient fixed member. The switch 65 is located so that the extension 27 on the charging container 20 will actuate it in the downward movement of the charging container 20. The container 20 is here not mechanically arrested by contacting the switch 65, rather the opening of the switch 65 serves to interrupt electric power being supplied to the solenoid of the spring loaded outlet valve operating mechanism 53 so that the valve 52 will rapidly close, halting all flow of liquid out of the outlet pipe 32 and hence halting the downward movement of the charging container 20. The limit switch 65 may be moved up or down upon the vertical support 67 to any position at which it is desired to halt the downward movement of the container 20. A convenient linear volumetric scale 68 may be provided on the support 67 for this positioning.

One exemplary electrical circuit which may be used with the embodiment of FIGURE 1 is illustrated in FIGURE 2. The pair of leads 70 are connected to a conventional electrical power source, such as an A.C. line. An external switch 71 may be a conventional microswitch which is normally in a first contact 72 position, and is adapted to switch into a second contact 73 position when a vessel ready to be filled is under the outlet pipe 51. In the first contact 72 position only the solenoid of the inlet valve mechanism 43 is connected to the electrical source, while in the second contact 73 position only the solenoid of the outlet valve mechanism 53 is connected to the electrical source—through the normally closed limit switch 65. The inlet valve 42 will normally be held open in the above arrangement, but the charging container 20 will not overfill, being limited by the fixed stop 60.

The operation of the measuring and discharging apparatus 10 is quite simple. Assuming by way of example that the apparatus 10 is to be used rapidly and continuously fill one-half gallon milk cartons, the limit switch 65 is positioned upon the support 67 so that a volume of one-half gallon will be measured by the movement of the charging container 20 from the upper stop 60 to the position where the extension 27 actuates the limit switch 65. A source of milk under pressure is connected to the inlet pipe 41.

By opening the inlet valve 42, milk flow through the inlet pipe 41 into the connecting pipe 33 and up into the space 34. All air in the apparatus 10 will of necessity then rise to the highest level, which is under the closed end 21 of the charging container 20. Opening the valve 24 then allows the air to be bled out the vent 23 by the pressure of the liquid. Once all the air has been exhausted, the valve 24 is allowed to close, leaving the entire system filled with fluid. The apparatus 10 is now ready for its operation.

Applying electric power to the pair of leads 70 causes the inlet valve 42 to be held open (switch 71 being in its normal first contact 72 position). Consequently, fluid will flow from the inlet pipe 41 into the charging container 20, the force of the fluid pressure pushing the container upward until it is stopped by the upper stop 60. The apparatus 10 remains in this position until the movement of a milk carton into the filling position actuates the external switch 71, which causes the inlet valve 42 to close and the outlet valve 52 to open, allowing the fluid in the charging container 20 to discharge through outlet pipe 51 into the milk carton. As the charging container 20 in effect floats upon the fluid with the space 34, it moves downward evenly as fluid flows out of the space 34. The tendency of liquid to seek a level will exert a self-stabilizing force on the charging container 20 tending to prevent it from tilting to one side or the other during its vertical movement. However, guides contacting the sides of the charging container 20 may be provided to insure that the charging container 20 moves in a vertical path. As the charging container 20 moves, its interior surface 22 slides with respect to the periphery of the fixed platform 31, but the fluid seal 32, aided by the low fluid pressure within the space 34, allows little if any fluid to be lost. The discharge velocity of the liquid will be increased, for example, increasing the weight of the charging container 20. However, the apparatus 10 will operate satisfactorily with even a lightweight charging container.

The liquid in the charging container 20 will rapidly discharge by gravity through the outlet pipe 51 until the container 20 has dropped to the level at which the limit switch 65 is actuated. This opens the circuit to the valve operating mechanism 53 thereby allowing the valve 52 to close rapidly. Thus, a pre-set measured volume of fluid is discharged. The refilling operation will begin automatically when the milk carton moves out of the filling position and switch 71 returns to its normal contact 72 position. For a more rapid refilling cycle, the valve operating mechanism 43 could be so constructed so to open the valve 42 automatically upon the closing of the valve 52.

Disassembly of the apparatus 10 for cleaning is extremely simple. The charging container 20 may simply be slid upward by hand until it clears the fixed platform 31. It may be then cleaned, and replaced in the same manner. With the charging container 20 removed the interior of the connecting pipe 33 is readily accessible for cleaning.

While the preferred embodiment 10 described above has a fixed upper stop 60 and a movable limit switch 65, it is to be appreciated that the invention is not limited to this arrangement, and either or both of the above limits on the movement of the charging container may be fixed or adjustable, and either electrical or mechanical. The fixed platform 31 may serve as the lower stop. Also, numerous other manual, timed, or automatic arrangements for initiating and controlling the discharge and measuring operations of a device of the invention may be readily envisioned.

While in the apparatus 10 the charging container 20 is mounted for vertical reciprocal movement which enables a simple gravity flow discharge arrangement, it is to be appreciated that numerous other configurations of the charging container 20 and the inlet and outlet structures may be constructed. The charging container 20 could be mounted for horizontal reciprocal movement, providing external force means such as spring loading acting upon the container were provided to accomplish the discharge movement.

The apparatus described herein is presently considered to be preferred, however, it is contemplated that further variations and modifications within the purview of those skilled in the art can be made herein, and it is intended to cover in the appended claims all such variations and modifications as fall within the true spirit and scope of the invention.

What is claimed is:

1. A fluid dispenser for repetitively discharging a measured volume of liquid comprising an expansible fluid container normally urged into an unexpanded condition but adapted to be expanded by internal fluid pressure, fluid conduit means communicating with the interior of said container, valve means for selectively connecting and disconnecting said conduit means to a supply of fluid under pressure, said conduit means when so connected causing said fluid to be introduced into said container to expand said container, limit means for selectively limiting the amount of expansion of said container and therefore the volume of said fluid introduced therein, second valve means for venting said fluid conduit means after said conduit means is disconnected from said supply of fluid under pressure so as to permit said container to return to the unexpanded condition and to discharge fluid therefrom through said conduit means.

2. A fluid dispenser for repetitively discharging a measured volume of liquid comprising a container including a cup-like member and a closure member therefor, said members being disposed in close-fitting, slidable relation permitting relative motion one to the other to vary the volume of said container and being normally urged toward one another, fluid conduit means communicating with the interior of said container, valve means for selectively connecting and disconnecting said conduit means to a supply of fluid under pressure, said conduit means when so connected causing said fluid to be introduced into said container and said container members to be moved apart by the pressure of said fluid so as to increase both the volume of said container and the volume of fluid contained therein, means for limiting this relative movement of said members and to thus control the amount of fluid introduced into said container, second valve means for venting said fluid conduit means after said conduit means is disconnected from said supply of fluid under pressure so as to permit said members to move toward one another and to discharge fluid from said container.

3. A fluid dispenser for repetitively discharging a measured volume of liquid comprising a fixed base means, a container means mounted in close-fitting relationship over said base means and reciprocally slidable therewith so as to form a substantially sealed chamber of variable volume therewith, adjustable limiting means for controlling the limits of the reciprocal movement of said container means between maximum and minimum volume positions, liquid inlet means connected to a source of liquid under pressure including a valve communicating with said chamber through said base means for admitting liquid into said chamber so that said container means is moved to said maximum volume position by pressure applied by said liquid to said container means, and liquid outlet means including a valve and communicating with said chamber through said base means for passing liquid out of said chamber so that said container means moves to said minimum volume position, said limiting means having for one said position a fixed stop and having for the other said position a variable stop comprising a sensing means controlling one of said valves, the direction of movement of said container means being responsive to the amount of pressure of said liquid within said chamber, and the position of said container means corresponding to the volume of liquid within said chamber.

References Cited by the Examiner
UNITED STATES PATENTS 2,501,004　3/50　Reese _____ 222—335 X
2,580,256　12/51　Tacchella _____ 222—309 X LOUIS J. DEMBO, *Primary Examiner.*